United States Patent
Baumgartner et al.

(10) Patent No.: US 10,439,683 B1
(45) Date of Patent: Oct. 8, 2019

(54) BROADCAST RELAYING VIA SINGLE-CHANNEL TRANSMISSION

(71) Applicant: SINCLAIR BROADCAST GROUP, INC., Hunt Valley, MD (US)

(72) Inventors: Frederick M. Baumgartner, Elizabeth, CO (US); Michael J. Simon, Frederick, MD (US); William Soreth, Cockeysville, MD (US); Thomas Ian Hoots, Towson, MD (US); Marshall Hans Behrmann, York, PA (US); Louis Herbert Libin, Woodmere, NY (US)

(73) Assignee: Sinclair Broadcast Group, Inc., Hunt Valley, MD (US)

( * ) Notice: Subject to any disclaimer, the term of this patent is extended or adjusted under 35 U.S.C. 154(b) by 0 days.

(21) Appl. No.: 16/007,265

(22) Filed: Jun. 13, 2018

(51) Int. Cl.
*H04H 20/31* (2008.01)
*H04B 7/026* (2017.01)
*H04B 7/155* (2006.01)
*H04L 1/00* (2006.01)
*H04L 1/06* (2006.01)
*H04H 20/02* (2008.01)
*H04H 20/67* (2008.01)
*H04H 20/72* (2008.01)

(52) U.S. Cl.
CPC ......... *H04B 7/026* (2013.01); *H04B 7/15521* (2013.01); *H04H 20/02* (2013.01); *H04H 20/31* (2013.01); *H04H 20/67* (2013.01); *H04H 20/72* (2013.01); *H04L 1/0058* (2013.01); *H04L 1/0071* (2013.01); *H04L 1/06* (2013.01)

(58) Field of Classification Search
CPC .... H04B 7/026; H04B 7/15521; H04H 20/02; H04H 20/31; H04H 20/67; H04H 20/72; H04L 1/0058; H04L 1/0071; H04L 1/06
USPC ........................................................ 455/3.01
See application file for complete search history.

(56) References Cited

U.S. PATENT DOCUMENTS

| | | | | |
|---|---|---|---|---|
| 7,336,646 B2 * | 2/2008 | Muller | ................... | H04H 20/67 348/384.1 |
| 7,796,697 B2 * | 9/2010 | Kim | ...................... | H04L 1/0047 375/259 |
| 8,074,147 B2 * | 12/2011 | Lee | ........................ | H04L 1/0053 714/758 |
| 8,279,908 B2 * | 10/2012 | Iannuzzelli | ............ | H04H 20/67 375/145 |

(Continued)

OTHER PUBLICATIONS

"ATSC Standard: A/321, System Discovery and Signaling," Advanced Television Systems Committee, Doc. A/321:2016, 28 pages, Mar. 23, 2016.

(Continued)

*Primary Examiner* — Hai V Nguyen
(74) *Attorney, Agent, or Firm* — Sterne, Kessler, Goldstein & Fox P.L.L.C.

(57) ABSTRACT

Systems and methods for relaying in broadcast single-frequency networks are disclosed herein. A single-frequency network can be formed in part using transmitters that receive data via a cooperative relay channel instead of a studio-to-transmitter link. In some embodiments, transmitter may use a portion of its transmission time to relay in-band information to the single-frequency network transmitter using time-division multiplexing.

20 Claims, 13 Drawing Sheets

(56) References Cited

U.S. PATENT DOCUMENTS

| | | | | |
|---|---|---|---|---|
| 8,675,773 | B2* | 3/2014 | Simon | H04L 27/04 375/224 |
| 8,693,507 | B2* | 4/2014 | Simon | H04H 20/67 370/509 |
| 8,862,048 | B2* | 10/2014 | Devine | H04H 20/103 455/3.01 |
| 8,929,401 | B2* | 1/2015 | Herrmann | H04N 21/235 370/476 |
| 9,215,038 | B2* | 12/2015 | Shin | H04L 1/0063 |
| 9,219,573 | B2* | 12/2015 | Milbar | H03M 13/09 |
| 9,363,753 | B2* | 6/2016 | Damnjanovic | H04W 52/0229 |
| 9,407,383 | B2* | 8/2016 | Milbar | H04H 20/72 |
| 9,467,255 | B2* | 10/2016 | Milbar | H04L 1/08 |
| 9,554,164 | B2* | 1/2017 | Herrmann | H04N 21/235 |
| RE46,399 | E* | 5/2017 | Kim | |
| 9,680,680 | B2* | 6/2017 | Moon | H04H 20/72 |
| 9,729,275 | B2* | 8/2017 | Kim | H04L 1/0041 |
| 9,774,893 | B2* | 9/2017 | Moon | H04N 21/23614 |
| 9,800,307 | B2* | 10/2017 | Moon | H04L 1/0041 |
| 9,843,845 | B2* | 12/2017 | Aitken | H04N 21/2381 |
| 9,866,297 | B2* | 1/2018 | Moon | H04L 1/0041 |
| 9,872,052 | B2* | 1/2018 | Moon | H04N 21/23614 |
| 9,923,747 | B2* | 3/2018 | Moon | H04H 20/72 |
| 10,009,079 | B2* | 6/2018 | Moon | H04L 1/0041 |
| 10,034,147 | B2* | 7/2018 | Shelby | H04L 65/80 |
| 10,051,333 | B2* | 8/2018 | Moon | H04H 20/72 |
| 10,090,966 | B2* | 10/2018 | Kim | H04L 1/0041 |
| 10,116,366 | B2* | 10/2018 | Moon | H04L 1/0041 |
| 10,158,452 | B2* | 12/2018 | Kim | H04L 1/0041 |
| 10,187,701 | B2* | 1/2019 | Park | H04H 20/426 |
| 10,248,496 | B2* | 4/2019 | Kroeger | G06F 11/1004 |
| 10,264,300 | B2* | 4/2019 | Moon | H04N 21/23614 |
| 10,284,228 | B2* | 5/2019 | Lim | H03M 13/2732 |
| 2005/0015162 | A1* | 1/2005 | Omura | G01C 21/206 700/94 |
| 2006/0088023 | A1* | 4/2006 | Muller | H04H 20/67 370/350 |
| 2006/0209941 | A1* | 9/2006 | Kroeger | H03L 7/093 375/222 |
| 2008/0298440 | A1* | 12/2008 | Kroeger | H04H 20/30 375/150 |
| 2010/0166042 | A1* | 7/2010 | Iannuzzelli | H04H 20/67 375/145 |
| 2011/0065377 | A1* | 3/2011 | Hieatt | H04H 20/103 455/3.01 |
| 2011/0258518 | A1* | 10/2011 | Shen | G11B 20/18 714/776 |
| 2012/0327955 | A1* | 12/2012 | Herrmann | H04N 21/235 370/476 |
| 2013/0016649 | A1* | 1/2013 | Damnjanovic | H04W 88/04 370/315 |
| 2013/0021932 | A1* | 1/2013 | Damnjanovic | H04W 52/0229 370/252 |
| 2013/0291046 | A1* | 10/2013 | Ko | H04N 21/84 725/116 |
| 2014/0150014 | A1* | 5/2014 | Aitken | H04N 21/2381 725/33 |
| 2014/0281833 | A1* | 9/2014 | Kroeger | H03M 13/1102 714/776 |
| 2014/0281835 | A1* | 9/2014 | Milbar | H03M 13/09 714/776 |
| 2014/0380135 | A1* | 12/2014 | Hong | H04H 20/42 714/776 |
| 2015/0085735 | A1* | 3/2015 | Shelby | H04L 65/80 370/312 |
| 2015/0113584 | A1* | 4/2015 | Herrmann | H04N 21/235 725/116 |
| 2016/0057562 | A1* | 2/2016 | Fang | H04W 72/044 370/329 |
| 2016/0087649 | A1* | 3/2016 | Limberg | H04N 21/2383 714/776 |
| 2016/0164648 | A1* | 6/2016 | Moon | H04L 1/0041 370/312 |
| 2016/0165273 | A1* | 6/2016 | Moon | H04N 21/23614 725/33 |
| 2016/0165274 | A1* | 6/2016 | Moon | H04N 21/23614 725/33 |
| 2016/0173181 | A1* | 6/2016 | Moon | H04L 1/0041 375/267 |
| 2016/0173312 | A1* | 6/2016 | Moon | H04H 20/72 375/295 |
| 2016/0182171 | A1* | 6/2016 | Milbar | H04H 20/72 375/259 |
| 2016/0182192 | A1* | 6/2016 | Milbar | H04L 1/08 714/748 |
| 2016/0197688 | A1* | 7/2016 | Moon | H04H 20/72 375/240.01 |
| 2016/0212626 | A1* | 7/2016 | Simon | H04W 16/14 |
| 2017/0019215 | A1* | 1/2017 | Milbar | H04L 1/08 |
| 2017/0302405 | A1* | 10/2017 | Kim | H04L 1/0041 |
| 2017/0353341 | A1* | 12/2017 | Moon | H04H 20/72 |
| 2018/0014048 | A1* | 1/2018 | Moon | H04N 21/23614 |
| 2018/0048368 | A1* | 2/2018 | Moon | H04L 1/0041 |
| 2018/0054654 | A1* | 2/2018 | Park | H04H 20/426 |
| 2018/0098132 | A1* | 4/2018 | Aitken | H04N 21/2381 |
| 2018/0115796 | A1* | 4/2018 | Yang | H04L 1/00 |
| 2018/0123663 | A1* | 5/2018 | Moon | H04L 1/0041 |
| 2018/0375601 | A1* | 12/2018 | Park | H04H 20/67 |
| 2019/0082228 | A1* | 3/2019 | Park | H04H 20/426 |

OTHER PUBLICATIONS

"ATSC Digital Television Standard, Part 1—Digital Television System," Advanced Television Systems Committee, Doc. A/53 Part 1:2013, 23 pages, Aug. 7, 2013.

"ATSC Digital Television Standard, Part 2—RF/Transmission System Characteristics," Advanced Television Systems Committee, Doc. A/53 Part 2:2011, 28 pages, Dec. 15, 2011.

"ATSC Digital Television Standard, Part 3—Service Multiplex and Transport Subsystem Characteristics," Advanced Television Systems Committee, Doc. A/53 Part 3:2013, 21 pages.

"ATSC Digital Television Standard: Part 4—MPEG-2 Video System Characteristics," Advanced Television Systems Committee, Doc. A/53 Part 4:2009, 18 pages, Aug. 7, 2009.

"ATSC Digital Television Standard, Part 5—AC-3 Audio System Characteristics," Advanced Television Systems Committee, Doc. A/53 Part 5:2014, 9 pages, Aug. 28, 2014.

"ATSC Digital Television Standard, Part 6—Enhanced AC-3 Audio System Characteristics," Advanced Television Systems Committee, Doc. A/53 Part 6:2013, 28 pages, Aug. 7, 2013.

* cited by examiner

| Mod | LDPC Code Rate | | | | | | | | | | | |
|---|---|---|---|---|---|---|---|---|---|---|---|---|
| | 2/15 | 3/15 | 4/15 | 5/15 | 6/15 | 7/15 | 8/15 | 9/15 | 10/15 | 11/15 | 12/15 | 13/15 |
| QPSK | -6.23 | -4.32 | -2.89 | -1.70 | -0.54 | 0.30 | 1.16 | 1.97 | 2.77 | 3.60 | 4.49 | 5.53 |
| 16NUC | -2.73 | -0.25 | 1.46 | 2.82 | 4.21 | 5.21 | 6.30 | 7.32 | 8.36 | 9.50 | 10.57 | 11.83 |
| 64NUC | -0.26 | 2.27 | 4.15 | 5.96 | 7.66 | 8.92 | 10.31 | 11.55 | 12.88 | 14.28 | 15.57 | 17.03 |
| 256NUC | 1.60 | 4.30 | 6.57 | 8.53 | 10.61 | 12.10 | 13.91 | 15.55 | 17.13 | 18.76 | 20.44 | 22.22 |
| 1kNUC | 3.23 | 6.17 | 8.77 | 11.07 | 13.46 | 15.30 | 17.46 | 19.45 | 21.35 | 23.43 | 25.52 | 27.62 |
| 4kNUC | 4.58 | 7.85 | 10.73 | 13.45 | 16.04 | 18.22 | 20.69 | 23.05 | 25.55 | 28.11 | 30.34 | 32.83 |

ATSC 3.0 (SNR dB) function of Modulation and Coding Rate

FIG. 8B

| QPSK / LDPC | 2/15 | 1/5 | 4/15 | 1/3 | 2/5 | 7/15 | 8/15 | 3/5 | 2/3 | 11/15 | 4/5 | 13/15 |
|---|---|---|---|---|---|---|---|---|---|---|---|---|
| Capacity (bits/s/Hz) | 0.2667 | 0.4000 | 0.5333 | 0.6667 | 0.8000 | 0.9333 | 1.0667 | 1.2000 | 1.3333 | 1.4667 | 1.6000 | 1.7333 |
| Bit Rate (6MHz) [Mbps] | 1.6 | 2.4 | 3.2 | 4 | 4.8 | 5.6 | 6.4 | 7.2 | 8 | 8.8 | 9.6 | 10.4 |
| C/N (AWGN) [dB] | -5.54031 | -3.7294 | -2.32001 | -1.30091 | -0.3291 | 0.560368 | 1.360287 | 2.191812 | 2.939387 | 3.813314 | 4.7012 | 5.758821 |
| C/N (Rayleigh) [dB] | -5.07031 | -2.9594 | -1.36001 | -0.08091 | 1.1509 | 2.300368 | 3.440287 | 4.691812 | 5.979387 | 7.463314 | 9.1412 | 11.52654 |

| 16 QAM / LDPC | 2/15 | 1/5 | 4/15 | 1/3 | 2/5 | 7/15 | 8/15 | 3/5 | 2/3 | 11/15 | 4/5 | 13/15 |
|---|---|---|---|---|---|---|---|---|---|---|---|---|
| Capacity (bits/s/Hz) | 0.5333 | 0.8000 | 1.0667 | 1.3333 | 1.6000 | 1.8667 | 2.1333 | 2.4000 | 2.6667 | 2.9333 | 3.2000 | 3.4667 |
| Bit Rate (6MHz) [Mbps] | 3.2 | 4.8 | 6.4 | 8 | 9.6 | 11.2 | 12.8 | 14.4 | 16 | 17.6 | 19.2 | 20.8 |
| C/N (AWGN) [dB] | -2.15001 | 0.3409 | 1.980287 | 3.149387 | 4.4612 | 5.520668 | 6.510587 | 7.562112 | 8.589687 | 9.743614 | 10.8015 | 12.07912 |
| C/N (Rayleigh) [dB] | -1.14001 | 1.4509 | 3.380287 | 4.779387 | 6.2712 | 7.580668 | 8.950587 | 10.27211 | 11.70969 | 13.23361 | 14.9815 | 17.43912 |

| 64 QAM / LDPC | 2/15 | 1/5 | 4/15 | 1/3 | 2/5 | 7/15 | 8/15 | 3/5 | 2/3 | 11/15 | 4/5 | 13/15 |
|---|---|---|---|---|---|---|---|---|---|---|---|---|
| Capacity (bits/s/Hz) | 0.8000 | 1.2000 | 1.6000 | 2.0000 | 2.4000 | 2.8000 | 3.2000 | 3.6000 | 4.0000 | 4.4000 | 4.8000 | 5.2000 |
| Bit Rate (6MHz) [Mbps] | 4.8 | 7.2 | 9.6 | 12 | 14.4 | 16.8 | 19.2 | 21.6 | 24 | 26.4 | 28.8 | 31.2 |
| C/N (AWGN) [dB] | 0.3509 | 2.851812 | 4.6512 | 6.3003 | 7.932112 | 9.30158 | 10.5515 | 11.83303 | 13.1306 | 14.52453 | 15.85241 | 17.32003 |
| C/N (Rayleigh) [dB] | 1.6009 | 4.301812 | 6.5512 | 8.3003 | 10.05211 | 11.55158 | 13.0915 | 14.62303 | 16.2006 | 17.85453 | 19.81241 | 22.44003 |

| 256 QAM / LDPC | 2/15 | 1/5 | 4/15 | 1/3 | 2/5 | 7/15 | 8/15 | 3/5 | 2/3 | 11/15 | 4/5 | 13/15 |
|---|---|---|---|---|---|---|---|---|---|---|---|---|
| Capacity (bits/s/Hz) | 1.0667 | 1.6000 | 2.1333 | 2.6667 | 3.2000 | 3.7333 | 4.2667 | 4.8000 | 5.3333 | 5.8667 | 6.4000 | 6.9333 |
| Bit Rate (6MHz) [Mbps] | 6.4 | 9.6 | 12.8 | 16 | 19.2 | 22.4 | 25.6 | 28.8 | 32 | 35.2 | 38.4 | 41.6 |
| C/N (AWGN) [dB] | 2.270287 | 4.7912 | 7.190587 | 8.929687 | 10.9215 | 12.58097 | 14.25089 | 15.81241 | 17.44999 | 19.08391 | 20.7618 | 22.53942 |
| C/N (Rayleigh) [dB] | 3.600287 | 6.7912 | 9.320587 | 11.15969 | 13.3015 | 15.16097 | 16.96089 | 18.64241 | 20.49999 | 22.39391 | 24.5418 | 27.22942 |

FIG. 9

BROADCAST RELAYING VIA SINGLE-CHANNEL TRANSMISSION

BACKGROUND

Field

The present disclosure relates to communications systems, including single-channel single-frequency network broadcast systems.

Related Art

The notion of a broadcast single frequency network (SFN) has been used in terrestrial broadcasting to increase the spectrum efficiency and improve the service quality of a broadcast service. This, by using some technique of enabling the same content (data) to be broadcast from multiple transmitters all operating on the same frequency and to produce identical RF waveforms (coherent signals) exactly at the same instant in time. The challenge is finding a method to provide all transmitters with the same content (data) and necessary signaling, timing information to broadcast on the same frequency without becoming interferers to one another but to improve the received quality of service.

The transmitted RF signals produced by these multiple SFN transmitters are time aligned and coherent, appearing to a receiver as natural RF propagation echoes or reflections in the reception environment, and the receiver then mitigates them as RF echoes emitted from a single transmitter.

The SFN method requires no special processing by the receiver, which is agnostic to existence of the SFN. Therefore, multiple techniques can be devised to enable the transmitters to become synchronized and produce coherent RF signals.

SUMMARY

A new hybrid harmonized technique is disclosed, which includes the concept of in-band SFN relay nodes using the new ATSC 3.0 broadcast standard. The focus is on enabling a Next Gen Broadcast Platform supporting SFN to provision mobile reception and service anywhere along with the more tradition fixed television reception in the living room in a future competitive wireless marketplace.

In some embodiments, a new hybrid broadcast SFN system architecture is disclosed that does not require an Studio to Transmitter Link (STL) to send content (data) preprocessed from a central master SFN Gateway node along with timing and metadata directly to every exciter node at each SFN transmitter site. The difference in a relay mode architecture is that the exciter node receives content (data), SFN timing and metadata via an over the air (OTA) RF relay link from another SFN transmitter node directly connected to central Gateway by STL usually (fiber, microwave). The content (data) received from relay is then processed using timing and signaling to create an RF waveform, which becomes a coherent broadcast signal from the transmitter site in SFN. Therefore, a harmonized hybrid SFN system architecture is possible using a combination of both STL and OTA RF relays to SFN exciter nodes at transmitter sites using the methods in this disclosure. The SFN relay mode can be technically enabled using some multiplexing technique supported in ATSC 3.0. In-band relaying with Time Division Multiplexing (TDM) will be described. The result of using SFN relay mode is more degrees of freedom for network operator to engineer and locate SFN transmitter sites where they may have the most benefit without constraint of bringing fiber, microwave to each site. There can be an unlimited number of SFN relay transmitter sites with a wide range of effective radiated power from (Watts to Kilowatts) that can be used to improve Quality of Service (QoS) by placing a broadcast signal (SFN) where it is needed to fill in service gaps, serve both indoor and outdoor locations, create hotspots in urban areas and at venues (stadiums, arenas) and/or by mounting on existing cellular towers, which helps enable new wireless broadcast business models and new services for consumers. Therefore, the SFN relay nodes can result in increased spectrum efficiency and improvement in QoS. This service can be provided by a third party for any combination of broadcasters in a market, much like a Distributed Antenna System (DAS) in 3GPP LTE-A cellular is deployed for Mobile Network Operators (MNO) in market today.

Consequently, improvements in broadcast QoS is important for Next Gen Broadcasting Platform using ATSC 3.0 to be successful and attract and retain consumers in a highly competitive wireless market. This future is when broadcast signals are received by consumers using mobile receivers anywhere not just in their living rooms using a new broadcast standard such as ATSC 3.0.

A Next Gen Broadcast Platform (NGBP) represents a new broadcast system architecture and paradigm shift that enables broadcast licensees to come together using shared licensed broadcast spectrum resources and a common infrastructure to create a multi-tenant virtualized broadcast cloud model instead of operating traditionally as independent isolated islands. This sharing of spectrum resource and infrastructure can enable cost savings but moreover innovation to remain competitive in a free wireless market.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 8A and 8B provide possible configurations provided by the ATSC 3.0 physical layer, according to some embodiments.

FIG. 9 and depicts 48 available options for ATSC 3.0 using LDPC short codes and QAM modulation, according to some embodiments.

Figure 1:
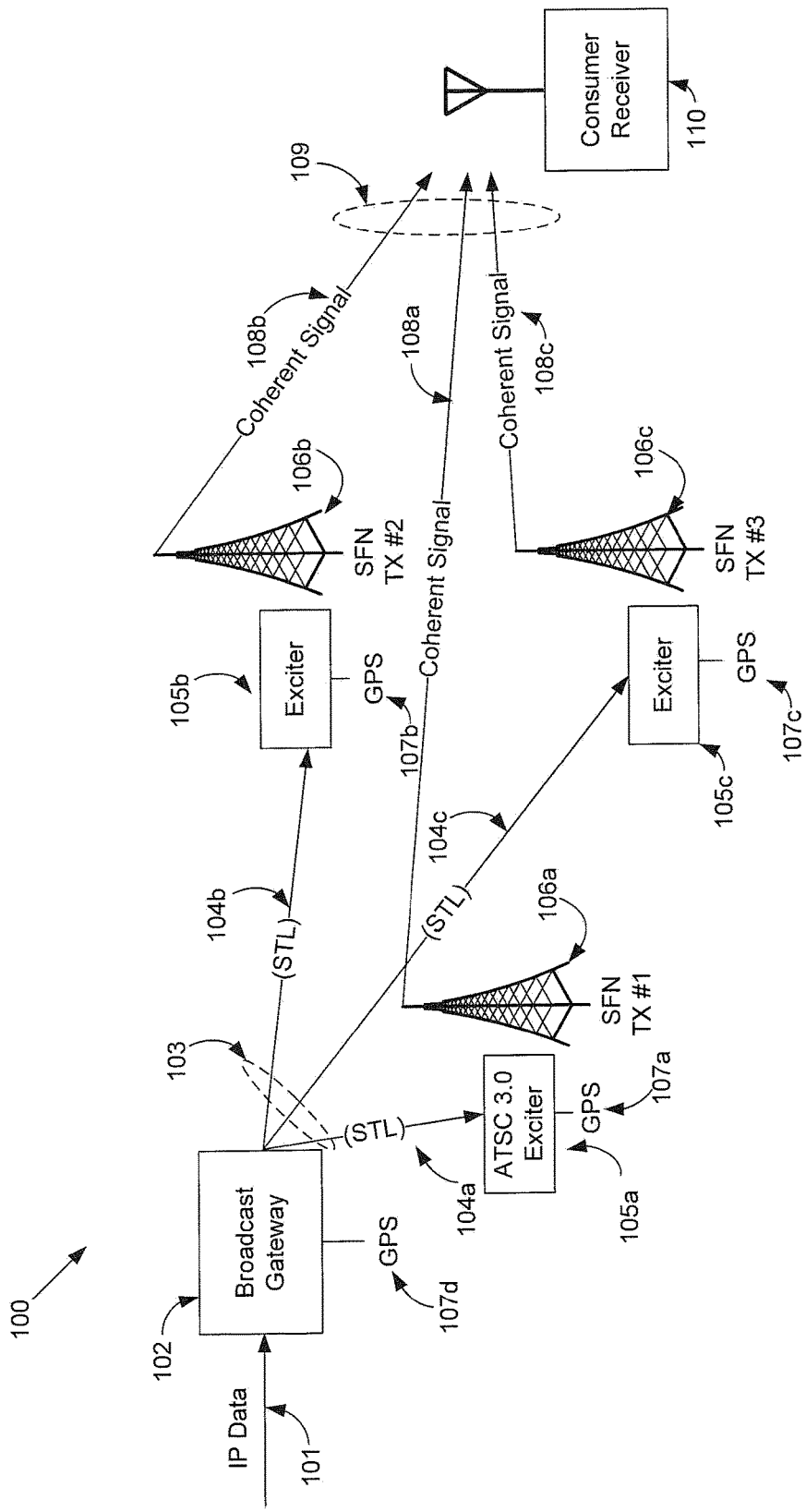
FIG. 1 illustrates an ATSC 3.0 SFN having a Studio to Transmitter Link (STL) between the gateway and each exciter, according to some embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

It should be appreciated that the following acronyms and abbreviations may be used herein:
ATSC Advanced Television Systems Committee
AWGN Additive White Gaussian Noise
BICM Bit-Interleaved Coded Modulation
dB Decibels
FEC Forward Error Correction
FFT Fast Fourier Transform
GI Guard Interval
GPS Global Positioning System
LDM Layer Division Multiplexing
LDPC Low Density Parity Check
MHz MegaHertz
NFV Network Function Virtualization
OFDM Orthogonal Frequency Division Multiplexing
OTA Over-the-Air
PLP Physical Layer Pipe
QAM Quadrature Amplitude Modulation
QPSK Quadrature Phase Shift Keying
RF Radio Frequency
SDN Software-Defined Networking
SFN Single Frequency Network
SNR Signal-to-Noise Ratio
STL Studio-to-Transmitter Link
TAI International Atomic Time
TDM Time Division Multiplexing
TX Transmitter
VNF Virtual Network Function Broadcast Single-Frequency Network Architecture In some embodiments, a broadcast SFN 100 can be configured as shown in FIG. 1. The broadcast SFN 100 can include a broadcast gateway 102 that receives IP data 101 and distributes data and control information 103 throughout the broadcast SFN 100. The data and control information 103 distributed by broadcast gateway 102 can include content formatted into physical layer pipes (PLPs), signaling, metadata, SFN timing, and transmission control. In some embodiments, the data and control information 103 conforms to the ATSC 3.0 standard, and in such embodiments the broadcast gateway 102 is an ATSC 3.0 gateway.

The broadcast SFN 100 can also include a plurality of transmitters illustratively suggested by SFN transmitter #1 106a, SFN transmitter #2 106b, and SFN transmitter #3 106c. A broadcast gateway 102 can couple to the transmitters 106a-106c via studio-to-transmitter links (STLs) 104a-104c, respectively. STLs 104a-104c each include a fiber or dedicated microwave connection between the gateway 102 and the respective SFN transmitters 106a-106e. Such fiber or dedicated microwave connections can be expensive and may limit the number or location of SFN transmitters 106a-106c. Each SFN transmitter 106a-106c can include an exciter 105a-105c that processes the data and control information 103 to create an RF waveform suitable for broadcast by the SFN transmitter 106a-106c.

The SFN transmitters 106a-106c wirelessly broadcast identical content on the same frequency. In the illustrated embodiment, the SFN network nodes (including SFN transmitters 106a-106c and gateway 102) have a common time reference 107a-107d available such as the Global Positioning System (GPS) to enable synchronous transmission. For illustrative purposes only, the broadcasts from SFN transmitters 106a-106c are discussed relative to consumer receiver 110. In some embodiments, consumer receiver 110 can be a fixed device such as a television receiver or a desktop computer. In other embodiments, consumer receiver 110 can be a nomadic device such as a tablet computer or laptop computer. In still further embodiments, consumer receiver 110 can be a mobile device such as a mobile phone, automobile-based device, aircraft-based device, etc. Although FIG. 1 illustrates one consumer receiver 110, there is no limit to the number of devices that could receive the signals broadcast from SFN transmitters 106a-106c.

The broadcasts from SFN transmitters 106a-106c arrive at the consumer receiver 110 over paths 108a-108c, respectively. At the consumer receiver 110, the signals on these paths 108a-108c combine to form a single received signal 109. Differences in the lengths of the paths 108a-108c can cause the broadcasts from SFN transmitters 106a-106c to arrive at slightly different times due to reflections caused by the RF propagation environment or non-uniform distances between the SFN transmitters 106a-106c and the consumer receiver 110. To the consumer receiver 110, such differences appear as naturally-occurring echoes of a signal transmitted by a single transmitter. Therefore, the consumer receiver 110 can be agnostic to the broadcast SFN because it is capable of dealing with such echoes without knowledge or consideration of the existence of multiple SFN transmitters 106a-106c. For example, the ATSC 3.0 standard utilizes an orthogonal frequency division multiplexing (OFDM) physical layer with configurable guard interval lengths to handle propagation echoes regardless of their source.

In-Band Broadcast SFN Relaying Using Time-Division Multiplexing (TDM)

Figure 2:
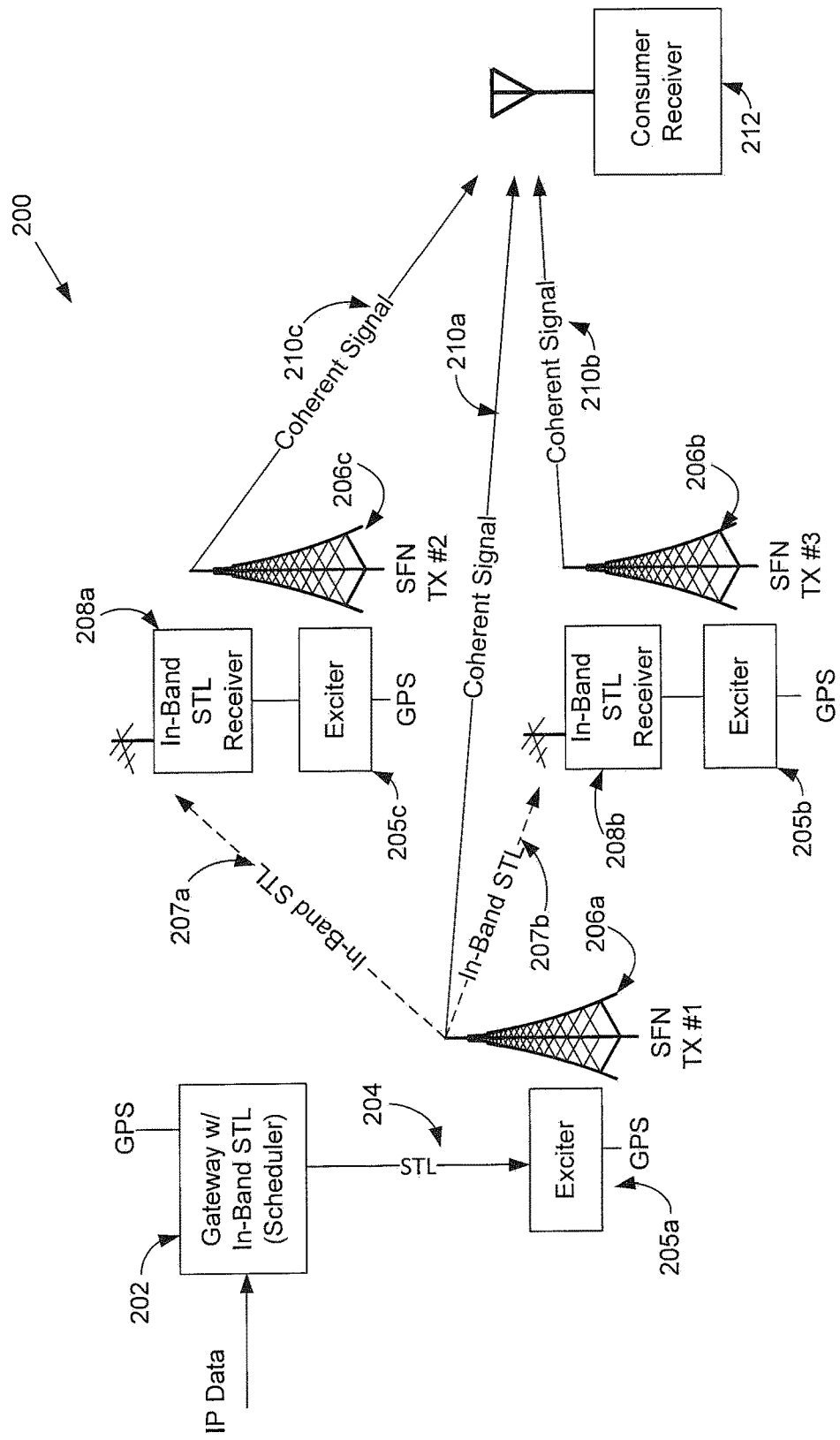
FIG. 2 illustrates an example cooperative single-channel broadcast system that uses in-band wireless relays instead of STLs to feed a subset of SFN transmitters, according to some embodiments.

The cost and complexity of deploying a separate STL for each SFN transmitter can limit the number and location of SFN transmitters. FIG. 2 illustrates an embodiment of a cooperative single-channel in-band broadcast system 200 that uses wireless relays instead of STLs to feed a subset of SFN transmitters. In the illustrated embodiment, transmitter 206a uses a portion of its transmission time to wirelessly relay information to in-band receivers 208a, 208b. In this manner, SFN transmitters 206b and 206c can operate without an expensive STL connecting them to the gateway 202. As discussed further below, the SFN transmitter 206a multiplexes the relay signal with the broadcast signal using a time-division multiplexing (TDM) approach.

The single-channel in-band broadcast system 200 can include a gateway 202 having in-band TDM Relay functionality. The gateway 202 is the SFN master node with overall system orchestration responsibility supporting the exciters in the SFN of broadcast system 200. The exciters are considered SFN slave nodes and are connected to the gateway 202 either directly via an STL or an over-the-air (OTA) in-band relay link.

Unlike SFN 100 of FIG. 1, the SFN of broadcast system 200 has a single STL communication path 204 that connects the gateway 202 to one exciter 205a, corresponding to SFN transmitter 206a. Exciters 205b and 205c, in contrast, are coupled to in-band STL receivers 208b and 208a, respectively. The in-band STL receivers 208a and 208b receive and decode the relay transmission 207a and 207b (e.g., the in-band STL frames as discussed in more detail below) over a broadcast channel (e.g., a cooperative relay channel) from SFN transmitter 206a. Thus, in-band STL receivers 208a and 208b provide connections between gateway 202 and exciters 205b and 205c via the SFN transmitter 206a. The SFN transmitters 206a-206c then broadcast, on the same channel (e.g., same broadcast channel) on which the relay transmission was received, time-aligned coherent signals 210a-210c that are received by consumer receiver 212 tuned to the single channel of the SFN of broadcast system 200.

It is noted that although the in-band STL receiver, the exciter, and the SFN transmitter are illustrated as separate devices in FIG. 2, the embodiments of this disclosure are not limited to this example. The in-band STL receiver, the exciter, and/or the SFN transmitter can be part of one or more devices.

Figure 3:
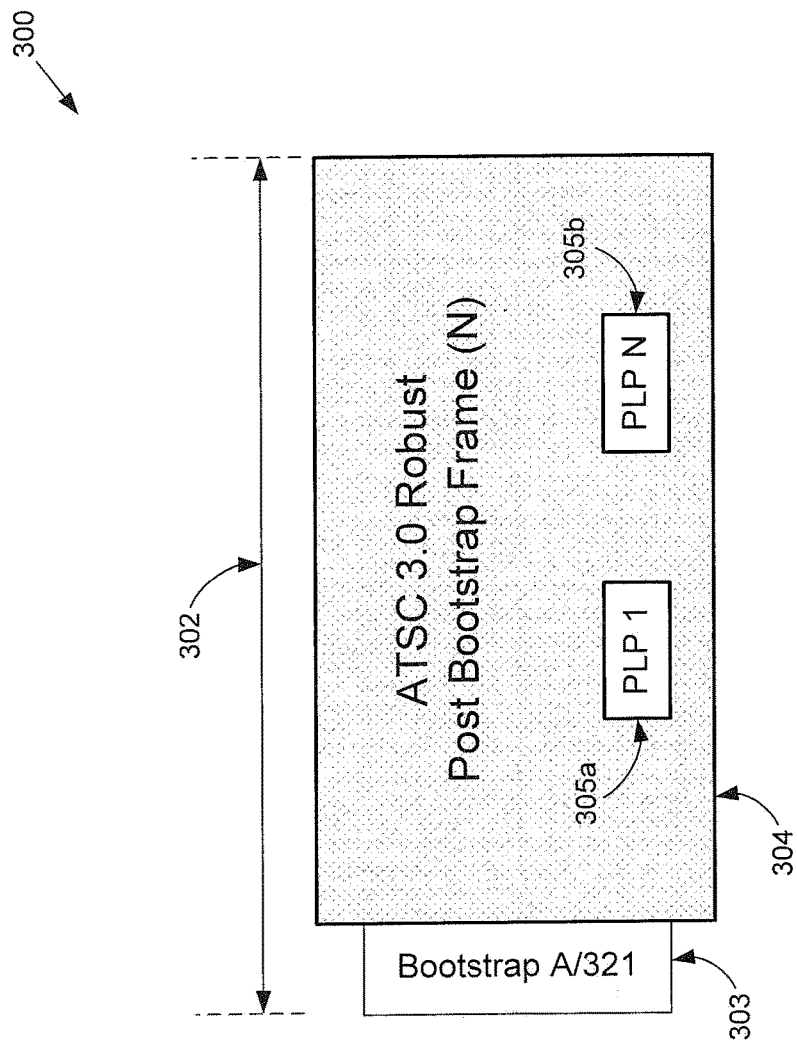
FIG. 3 illustrates an example robust transmission, according to some embodiments.

FIG. 3 illustrates an example robust transmission 300. In reference to FIG. 2, the SFN transmitters 206a-206c can broadcast a robust frame 302 containing data received from either an STL link (in the case of SFN transmitter 206a) or relay transmissions (in the case of SFN transmitters 206b and 206c). Specifically, robust frame 302 can include bootstrap 303 and robust payload 304. The bootstrap 303 can be used by a receiver for initial channel synchronization. The bootstrap 303 can also contain low level signaling about the robust payload 304. The robust payload 304 can include a number of PLPs 305a-305b. The PLPs 305a-305b can contain content for mobile services provided by SFN broadcasts.

The SFN transmitters 206a-206c can broadcast the PLPs 305a-305b at a lower rate to provide robustness in the transmission. That is, the information relayed from SFN transmitter 206a to SFN transmitters 206b and 206c can be decoded and re-encoded into a more robust waveform suitable for reception by devices without a high SNR or line-of-sight requirement. For example, the ATSC 3.0 physical cal layer supports a large range of FFT sizes for its OFDM waveform, as well as variable-rate LDPC coding, to enable reception in a broad range of conditions. In some embodiments, the robust payload 304 can be transmitted with the following low-capacity parameters supported by ATSC 3.0:
   FFT Size: 8,192
   LDPC Code Rate: 7/15
   Modulation: 16 QAM
   Guard Interval: 150 μs Using these parameters, the robust payload 304 can be transmitted at 8.6 Mbps in an 6 MHz channel. To reliably decode such a robust signal, a receiver may only require an SNR of 5.2 dB. Thus, consumer receivers (e.g., receiver 212 in FIG. 2) need not have a line-of-sight to the SFN transmitters 206a-206c. Many other values could be selected for transmitting robust payload 304. The relay transmission parameters may be selected by an orchestration engine (e.g., gateway 202 in FIG. 2). It is noted these values are provided as an example, and the embodiments of this disclosure are not limited to this example.

Figure 4:
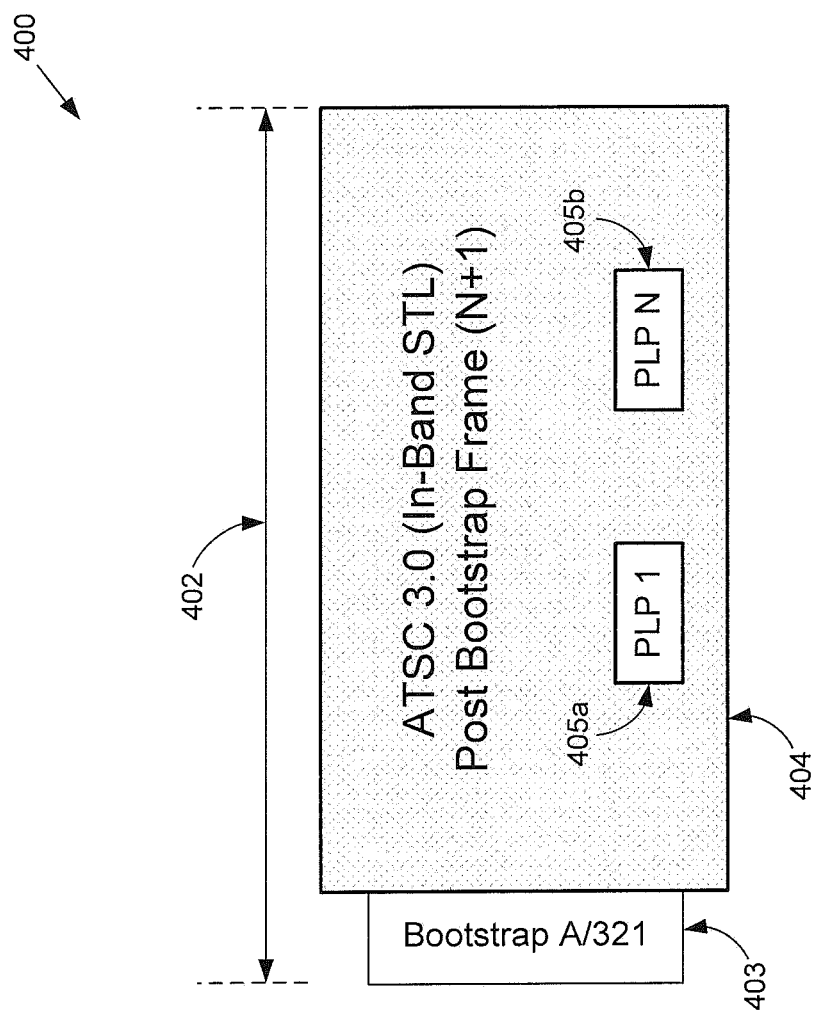
FIG. 4 illustrates an example in-band STL transmission, according to some embodiments.

FIG. 4 illustrates an example in-band STL transmission 400 (also referred to as relay transmission). For example, relay transmission 207a, 207b of FIG. 2 can be in-band STL transmission 400. In reference to FIG. 2, the SFN transmitter 206a can transmit an in-band STL frame 402 containing data received from STL link 204. Further, in-band STL frame 402 can include control information for the in-band STL receiver (208a, 208b), the exciter (205b, 205c), and/or SFN transmitter (206b, 206c) for generating the robust frame (302) and/or any frames generated in the process of generating the robust frame. Specifically, in-band STL frame 402 can include bootstrap 403 and in-band STL payload 404. The bootstrap 403 can be used by a receiver for initial channel synchronization. The bootstrap 403 can also contain low level signaling about the in-band STL payload 404. The in-band STL payload 404 can include a number of PLPs 405a-405b. The PLPs 405a-405b can contain content for mobile services provided by SFN broadcasts.

The SFN transmitter 206a can transmit the PLPs 405a-405b at a high rate to minimize the amount of time spent relaying the information to SFN transmitters 206b and 206c. That is, the information relayed from SFN transmitter 206a to SFN transmitters 206b and 206c can be encoded into a high-rate waveform suitable for reception by receivers with a high SNR and line-of-sight to the transmitter. For example, the ATSC 3.0 physical layer supports a large range of FFT sizes for its OFDM waveform, as well as variable-rate LDPC coding, to enable reception in a broad range of conditions. In some embodiments, the in-band STL payload 404 can be transmitted with the following high-capacity parameters supported by ATSC 3.0:
   FFT Size: 32,768
   LDPC Code Rate: 13/15
   Modulation: 4096 QAM
   Guard Interval: 150 μs Using these parameters, the in-band STL payload 404 can be transmitted at 57.2 Mbps in an 6 MHz channel. To reliably decode such a robust signal, a receiver may require an SNR of 33 dB. Thus, in-band STL receivers 208a and 208b can require a directional antenna and/or a line-of-sight to the SFN transmitter 206a. Many other values could be selected for transmitting in-band STL payload 404. The relay transmission parameters may be selected by an orchestration engine (e.g., gateway 202 in FIG. 2). It is noted these values are provided as an example, and the embodiments of this disclosure are not limited to this example.

Figure 5:
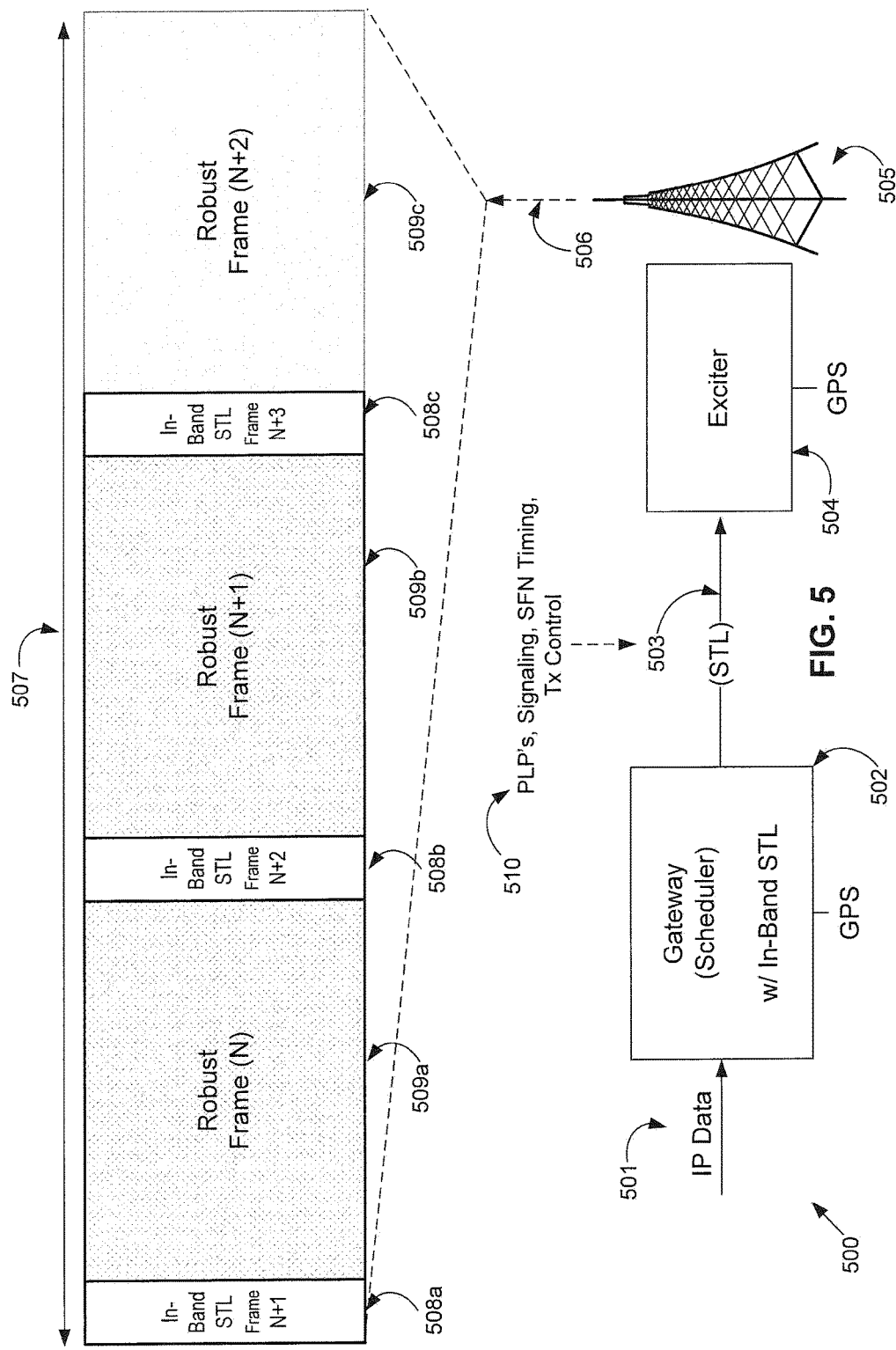
FIG. 5 illustrates a relay transmission of a series of TDM frames, according to some embodiments.

FIG. 5 illustrates a relay transmission 500 of a series of TDM frames 507 that are broadcast 506 from SFN transmitter 505 using exciter 504 on, for example, a broadcast channel. In some embodiments, the gateway 502 can orchestrate the transmission by receiving IP data 501, and providing the exciter 504 with information 510 including signaling, SFN timing, PLPs (e.g., including data to be sent to in-band STL receiver(s) and/or consumer receiver(s)), and transmission control over STL 503. According to some embodiments, SFN transmitter 505 can be SFN transmitter 206 of FIG. 2, exciter 504 can be exciter 205a, and gateway 502 can be gateway 202 of FIG. 2.

The start of the frames 508a-508c and 509a-509c can be deterministically time aligned at the air interface of their respective antennas with respect to TAI or GPS time available at the SFN transmitter 505. The central orchestration of gateway 502 allows for broadcasting transmitting in-band STL frames 508a-508c (e.g., in-band STL frame 402 of FIG. 4) one frame in advance of when a robust frame in the same channel (e.g., robust frame 302 in FIG. 3) will be scheduled and emitted by all of the SFN transmitters (e.g., SFN transmitters 206a-206c in FIG. 2).

FIG. 5 illustrates the timing of this orchestration with the in-band STL frames 508a-508c having frame numbers N+1, N+2, and N+3 respectively. In the illustrated embodiment, in-band STL frame 508a carrying data for frame N+1 is transmitted before the robust frame 509a carrying data for frame N. This advance transmission allows the in-band STL receivers (e.g., receivers 208a and 208b in FIG. 2) to decode the relayed PLPs (e.g., PLPs 405a-405b in FIG. 4) and re-encode them into robust PLPs (e.g., PLPs 305a-305b in FIG. 3) for broadcast in a robust frame (e.g., robust frame 509b carrying data for frame N+1). This advance transmission causes a latency of slightly more than one frame, which in some embodiments corresponds to 250 ms when using a common ATSC 3.0 frame length.

It is noted that although the exciter and the SFN transmitter are illustrated as separate devices in FIG. 5, the embodiments of this disclosure are not limited to this example. The exciter and the SFN transmitter can be part of one or more devices.

Figure 6:
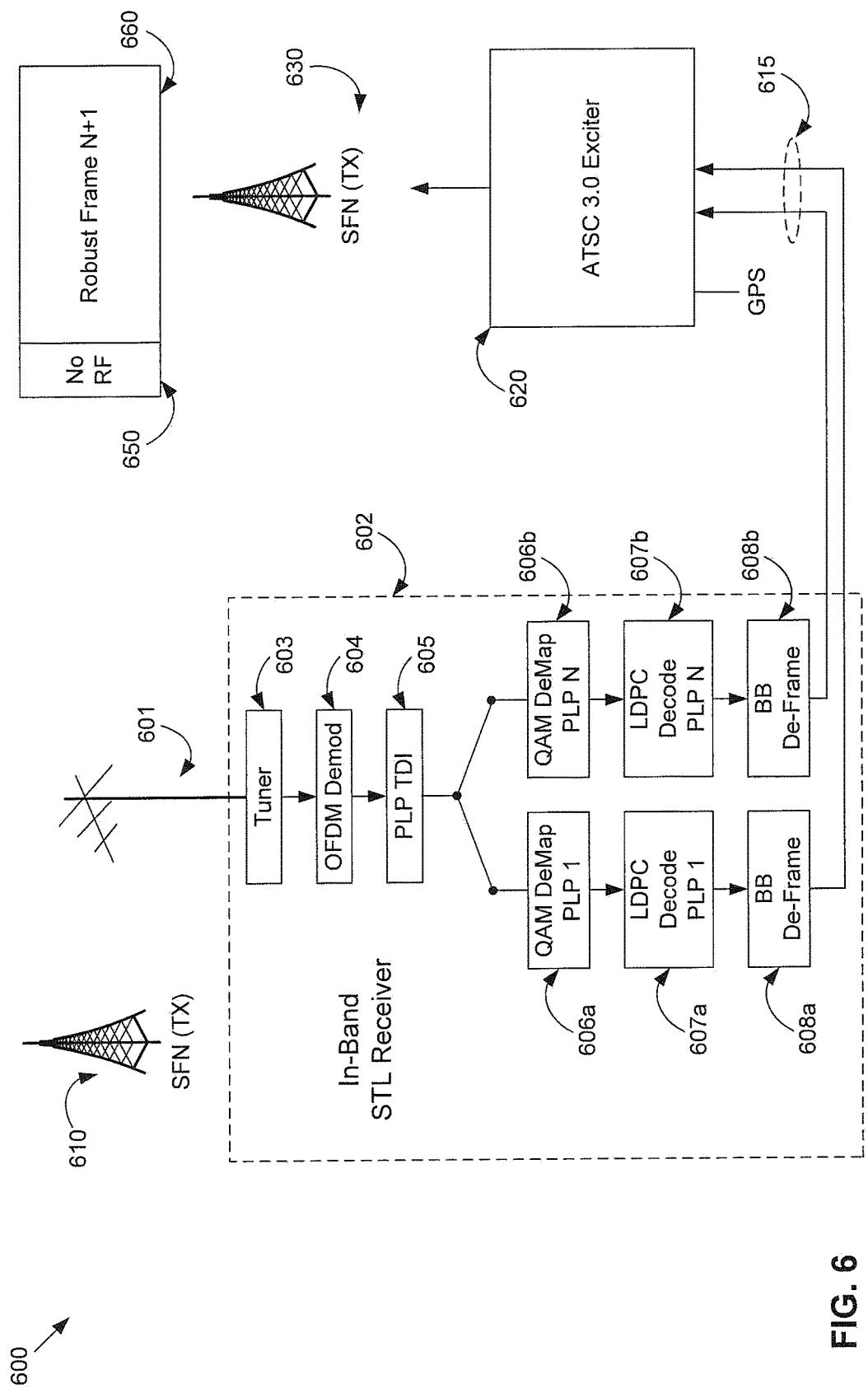
FIG. 6 illustrates details of an in-band STL receiver in the context of a single-channel in-band broadcast relay system, according to some embodiments.

FIG. 6 illustrates details of an in-band STL receiver 602 in the context of an in-band SFN broadcast relay system 600, according to some embodiments. In-band STL receiver 602 may correspond to one or more in-band STL receivers 208a, 208b of FIG. 2. An SFN transmitter 610, which in some embodiments may correspond to SFN transmitter 206a in FIG. 2, emits a TDM frame. In some embodiments, the emitted TDM frame may correspond to TDM frame 507 in FIG. 5, which may include one or more in-band STL frames (e.g., in-band STL frames 508a, 508b, 508c) and/or one or more robust frames (e.g., robust frames 509a, 509b, 509c.)

An antenna 601 of in-band STL receiver 602 receives the TDM frame. For example, antenna 601 receives the TDM frame on a broadcast channel. In some embodiments, antenna 601 is a directional antenna that is aligned toward SFN transmitter 610 to ensure a high SNR. In some embodiments, antenna 601 can be configured with a line-of-sight to SFN transmitter 601 and receives the required SNR field strength with a fade margin calculated during site engineering.

In-band STL receiver 602 recovers the content, signaling, SFN timing, and transmission control data relayed by the SFN transmitter 610. For example, in-band STL receiver 602 receives an in-band STL frame with the TDM frame, recovers the content, signaling, SFN timing, and transmission control data within the in-band STL frame and forms an estimated frame (e.g., an estimated in-band STL frame) by processing the in-band STL frame. In-band STL receiver 602, alone or in combination with exciter 620 and/or SFN transmitter 630, forms a robust frame by encoding the estimated frame and broadcasts the robust frame on the same broadcast channel. According to some examples, the in-band STL frame was encoded at a first data rate and the robust frame is formed by encoding the estimated frame at a second data rate.

A tuner 603 of in-band STL receiver 602 is tuned to a frequency corresponding to the single-frequency network and produces a signal ready for digital demodulation and decoding. An OFDM demodulator 604 of in-band STL receiver 602 demodulates the OFDM signal, for example by removing a cyclic prefix, converting the received signal to the frequency domain, and performing frequency-domain equalization. A frequency and time deinterleaver 605 of in-band STL receiver 602 then deinterleaves the demodulated signal in frequency and/or time. Subsequently, the PLPs may be processed in parallel. For example, PLP 1 can be processed using a QAM demapper 606a, a LDPC decoder 607a, and a baseband de-framer 608a of in-band STL receiver 602, whereas PLP N can be processed in parallel using a QAM demapper 606b, an LDPC decoder 607b, and a baseband de-framer 608b of in-band STL receiver 602.

The discussion of each respective component will therefore be made with regard to PLP 1 without loss of generality towards other PLPs. QAM demapper 606a demaps the deinterleaved QAM symbols to a bitwise representation, which may constitute hard or soft outputs to the decoder. LDPC decoder 607a decodes LDPC codewords and produces uncoded information bits to the baseband de-framer 608a, which arranges the decoded data to passing to upper layers.

Accordingly, in-band STL receiver 602 is configured to form an estimated in-band STL frame based on the de-framed information. The de-framed information is then passed to exciter 620 for broadcast on the same broadcast channel on which it was received. Exciter 620 follows the orchestration instructions to construct the broadcast waveform. In other words, exciter 620 uses the de-framed information (e.g., the estimated in-band STL frame) to form broadcast waveform 660 (e.g., a robust frame). Exciter 620 uses the SFN timing and the GPS signal to emit broadcast waveform 660 from SFN transmitter 630 at a pre-determined time and substantially simultaneously with broadcasts by other SFN transmitters (regardless as to whether those other SFN transmitters were fed by an STL or a broadcast channel such as Channel Y relay). In some embodiments, broadcast waveform 660 corresponds to robust frame 302 of FIG. 3. In some embodiments, SFN transmitter 630 does not transmit an RF signal when SFN transmitter 610 is transmitting an in-band STL frame. This design allows for reception of the in-band STL frame without interference from the co-located in-band transmitter. The overall transmission from SFN transmitter 630 therefore may contain a silent portion 650 containing no RF signal. According to some examples, exciter 620 and/or in-band STL receiver 602 includes a timing circuit. The timing circuit controls timing of broadcasts from SFN transmitter 630, as discussed above.

It is noted that although the in-band STL receiver, the exciter, and the SFN transmitter are illustrated as separate devices in FIG. 6, the embodiments of this disclosure are not limited to this example. The in-band STL receiver, the exciter, and/or the SFN transmitter can be part of one or more devices.

Figure 7:
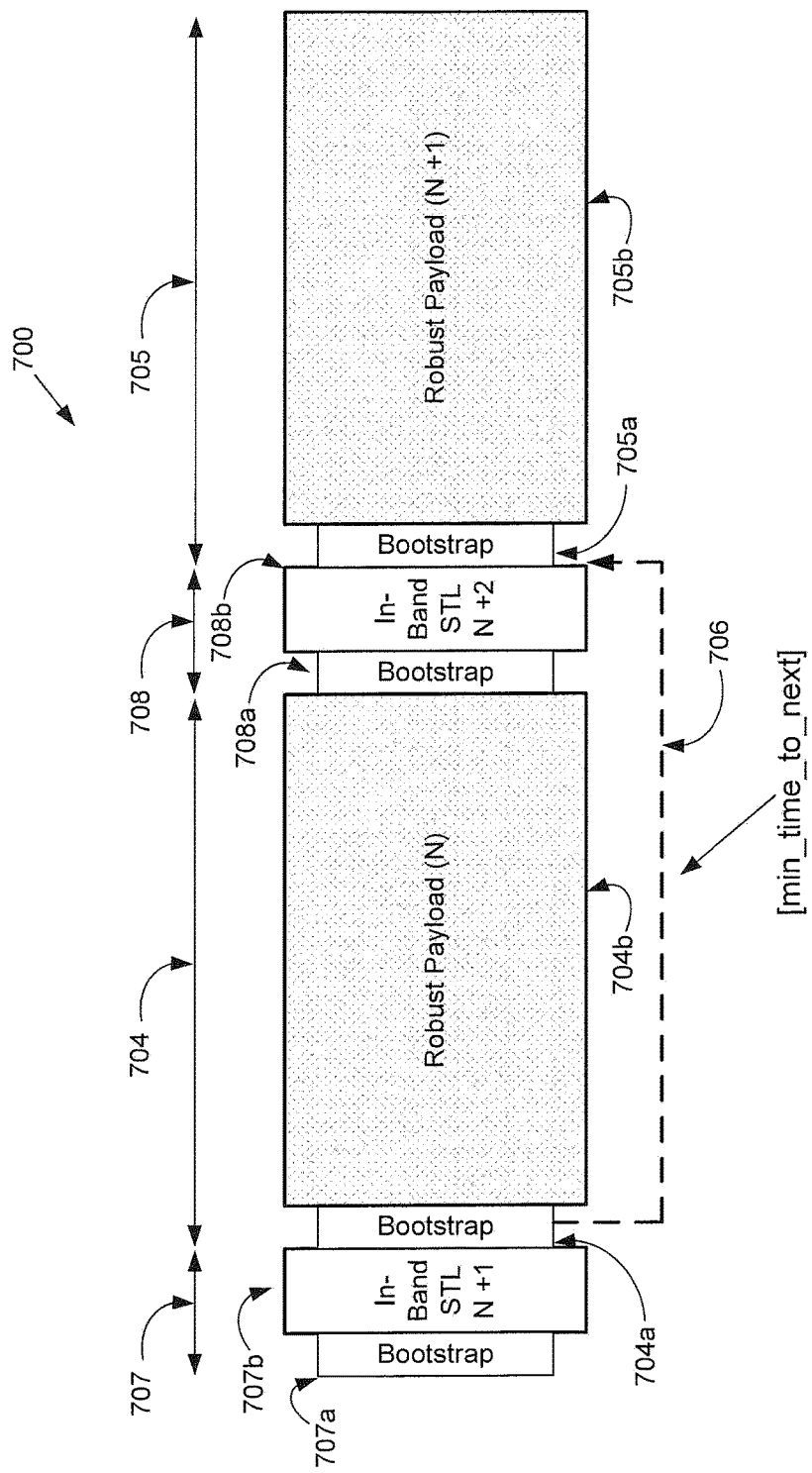
FIG. 7 illustrates TDM frames, according to some embodiments.

FIG. 7 illustrates TDM frames 700 according to some embodiments. The TDM frames 700 can comprise in-band STL frames 707 (including bootstrap 707a and in-band STL payload 707b) and 708 (including bootstrap 708a and in-band STL payload 708b) time-multiplexed with robust frames 704 (including bootstrap 704a and robust payload 704b) and 705 (including bootstrap 705a and robust payload 705b). In some embodiments, each payload 704b, 705b, 707b, 708b is preceded by a bootstrap 704a, 705a, 707a, 708a, for example a bootstrap signal complying with the ATSC A/321 protocol, which is incorporated herein in its entirety. The in-band STL payload 707b, 708b carry data to be relayed to other SFN transmitters using a professional broadcast relay receiver designed for that purpose. Thus, consumer receivers tuned to the SFN should not decode in-band STL payload 707b, 708b. In some embodiments, TDM frames 700 can utilize mechanisms in the ATSC 3.0 standard to allow consumer receivers to skip decoding of frames such as in-band STL payload 707b, 708b. For example, bootstraps 707a, 708a preceding in-band STL payload 707b, 708b can both be assigned a major version number that will be ignored by consumer ATSC 3.0 major version receivers. Other higher layer signaling mechanisms available in ATSC 3.0 may also be used to ensure that a ATSC 3.0 major version consumer receiver does not attempt to access these in-band STL frames.

Furthermore, in some embodiments, to ensure the continuous uninterrupted reception of the robust frames by an ATSC 3.0 consumer receiver, the bootstraps 704a, 705a can use the A/321 signaling known as min_time_to_next from Table 6.2 of the ATSC 3.0 A/321 standard, which is incorporated herein in its entirety. This signaling indicates the starting time, in milliseconds, of the next frame having the same major version as the bootstrap being decoded. Using this parameter in bootstrap 704a, for example, enables a consumer receiver to skip 706 over the bootstrap 708a and in-band STL payload 708b as shown, and resume decoding at the start of the next applicable bootstrap 705a corresponding to the next robust payload 705b.

Figure 8A:
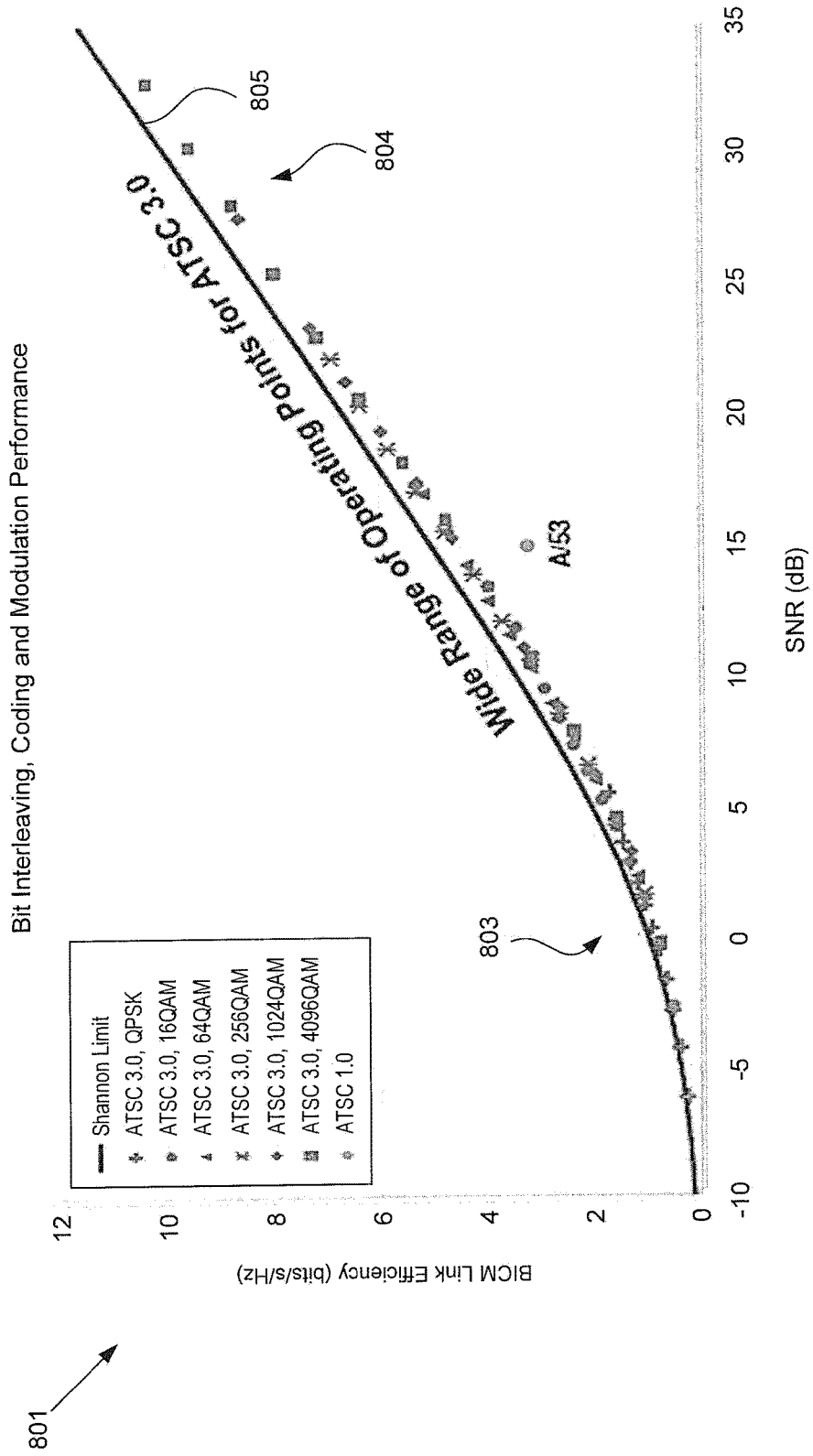

FIGS. 8A and 8B provide information that represent an example of the new ATSC 3.0 physical layer and its wide range of operating points 801 that can be chosen for a given service PLP by selections 802 from six modulation levels (QPSK, 16QAM, 64QAM, 256QAM, 1024QAM, 4096 QAM) and twelve LDPC code rates (2/15-13/15), giving a total of 72 potential operating points. Section 803 of graph 801 illustrates a lower capacity, more robust section of graph 801 and section 804 of graph 801 illustrates a higher capacity, less robust section of graph 801, according to some embodiments. A robust operating point is −6 dB SNR, having capacity of 1.3 Mbps, and the least robust operating point is 33 dB SNR, having capacity of 59 Mbps. Each operating point operates at a spectrum efficiency approaching the Shannon limit 805 as illustrated in graph 801. The current ATSC A/53 standard (incorporated herein in its entirety) that is currently deployed in the United States has only a single operating point, shown in the graph 801, and this operating point is not spectrum efficient. This wide number of very efficient operating points is used in part in with other technology in the design of the SFN relay modes disclosed herein.

FIG. 9 and depicts an example of 48 available options 900 for ATSC 3.0 using LDPC short codes (16200) and QAM modulation (QPSK, 16QAM, 64QAM, 256QAM) that may be potentially used for provisioning mobile service. As previously stated as an example, a robust payload 304 with 16QAM, 7/15 code rate yields, considering guard interval(s) and/or overhead, bit rate of 8.6 Mbps in a 6 MHz channel. To reliably decode such a robust signal, a receiver may only require an SNR of 5.2 dB.

Figures 10A, 10B:
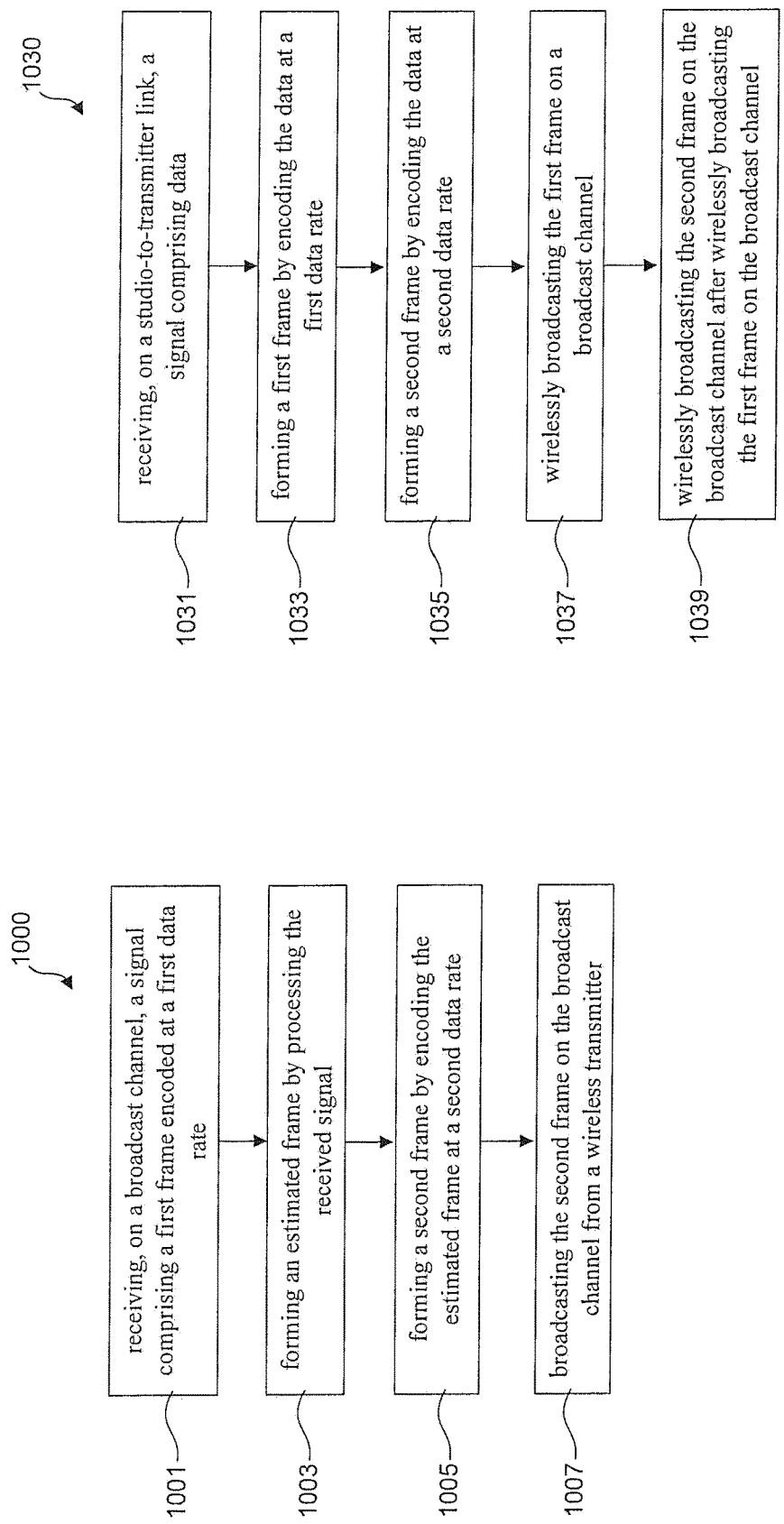
FIG. 10A is a flowchart depicting a method for generating a robust frame based on a received in-band STL frame, according to some embodiments.
FIG. 10B is a flowchart depicting a method for generating an in-band STL frame and a robust frame based on data received on an STL, according to some embodiments.

FIG. 10A is a flowchart depicting a method 1000, according to an embodiment of the present disclosure. For example, method 1000 can generate a robust frame based on a received in-band STL frame, according to some embodiments. In one embodiment, method 1000 is performed by system 200 of FIG. 2 and/or system 600 of FIG. 6. It is to be appreciated not all steps may be needed, and the steps may not be performed in the same order as shown in FIG. 10A. Reference is made to systems 200 and 600 in FIGS. 2 and 6 and transmissions 300 and 400 of FIGS. 3 and 4 merely for convenience of discussion. Other systems may be used to perform the method as will be understood by those skilled in the arts.

In 1001, an in-band STL receiver (e.g., in-band STL receiver 208a, 208b, 602) receives a signal that includes a first frame encoded at a first data rate. For example, the in-band STL receiver receives TDM frames including one or more in-band STL frames (e.g., in-band STL frame 402). The in-band STL receiver may receive the signal on a broadcast channel. The received signal can include content (e.g., data to be sent to consumer receivers), signaling, SFN timing, transmission control data, etc. According to some embodiments, the received signal is compliant with an Advanced Television Systems Committee (ATSC) 3.0 specification.

In 1003, the in-band STL receiver forms an estimated frame by processing the received signal. The estimated frame may include an estimated in-band STL frame. As discussed above with respect to FIG. 6, forming the estimated frame by processing the received signal can include demodulation, decoding, converting to frequency domain, equalization, deinterleaving, demapping, and/or other processing. According to some examples, forming the estimated frame by processing the received signal may include regenerating an estimated bit-interleaved coded modulation signal.

In 1005, the in-band STL receiver, alone or in combination with an exciter and/or an SFN transmitter, forms a second frame. Forming the second frame can include encoding the estimate frame at a second data rate. According to some examples, the received signal includes control information, and forming the second frame may include encoding the estimated frame based at least in part on the control information. According to some examples, the control information may include timing information. The second frame is a robust frame (e.g., robust frame 302 of FIG. 3), according to some embodiments. In some examples, the second data rate is lower than the first data rate. In other words, the in-band STL receiver receives the first frame encoded at a first data rate that is higher than the second data rate at which the in-band STL receiver forms and transmits the second frame.

In 1007, the in-band STL receiver, alone or in combination with the exciter and/or the SFN transmitter, broadcasts the second frame on, for example, the same broadcast channel at which the in-band STL receive received the signal. According to some examples, the broadcast of the second frame is substantially synchronized with a substantially identical transmission from a different wireless transmitter. In other words, the broadcast of the second frame by, for example, SFN transmitter 206c is substantially synchronized with a substantially identical transmission (e.g., transmission of substantially identical second frame) from a different wireless transmitter such as SFN transmitter 206a and/or SFN transmitter 206b.

FIG. 10B is a flowchart depicting a method 1030, according to an embodiment of the present disclosure. For example, method 1030 can generate an in-band STL frame and a robust frame based on data received on an STL, according to some embodiments. In one embodiment, method 1030 is performed by system 200 of FIG. 2 and/or system 500 of FIG. 5. It is to be appreciated not all steps may be needed, and the steps may not be performed in the same order as shown in FIG. 10B. Reference is made to systems 200 and 500 in FIGS. 2 and 5 and transmissions 300 and 400 of FIGS. 3 and 4 merely for convenience of discussion. Other systems may be used to perform the method as will be understood by those skilled in the arts.

In 1031, an exciter (e.g., exciter 205a, 504) receives a signal that includes data. The exciter may receive the signal including the data on a studio-to-transmitter link (e.g., STL 204 of FIG. 2 and/or STL 503 of FIG. 5). The received signal can include content (e.g., data to be sent to consumer receiver(s) and/or in-band STL receiver(s)), signaling, SFN timing, transmission control data, etc. According to some examples, the data may include a television signal for transmission on a broadcast channel.

In 1033, the exciter forms a first frame by, for example, encoding the data at a first data rate. According to some embodiments, the first frame can include an in-band STL frame (e.g., in-band STL frame 402 of FIG. 4.) In 1035, the exciter forms a second frame by, for example, encoding the data at a second data rate. According to some embodiments, the second frame can include a robust frame (e.g., robust frame 302 of FIG. 3.) In some examples, the second frame is compliant with an Advanced Television Systems Committee (ATSC) 3.0 specification.

According to some embodiments, the first data rate is higher than the second data rate. In other words, to generate the in-band STL frame, the exciter encodes the data a higher data rate than the data rate for generating the robust frame.

In some examples, to form the first frame, the exciter encode the data using a low-density parity check (LDPC) code having a first code rate and to form the second frame, the exciter encodes the data using an LDPC code having a second code rate.

In 1037 the exciter, using a wireless transmitter (e.g., SFN transmitter 206, 505) broadcasts the first frame on the broadcast channel. In 1039, the exciter, using the wireless transmitter (e.g., SFN transmitter 206, 505) broadcasts the second frame on the broadcast channel after broadcasting the first frame. In some example, in forming the first frame, the exciter by encodes control information corresponding to the broadcasting of the second frame on the broadcast channel.

According to some examples, the broadcast of the second frame is substantially synchronized with a substantially identical transmission from a different wireless transmitter. In other words, the broadcast of the second frame by, for example, SFN transmitter 206a is substantially synchronized with a substantially identical transmission (e.g., transmission of substantially identical second frame) from a different wireless transmitter such as SFN transmitter 206b and/or SFN transmitter 206c. In some examples, the exciter broadcasts the second frame substantially simultaneously from two transmitters on the same channel.

Figure 11:
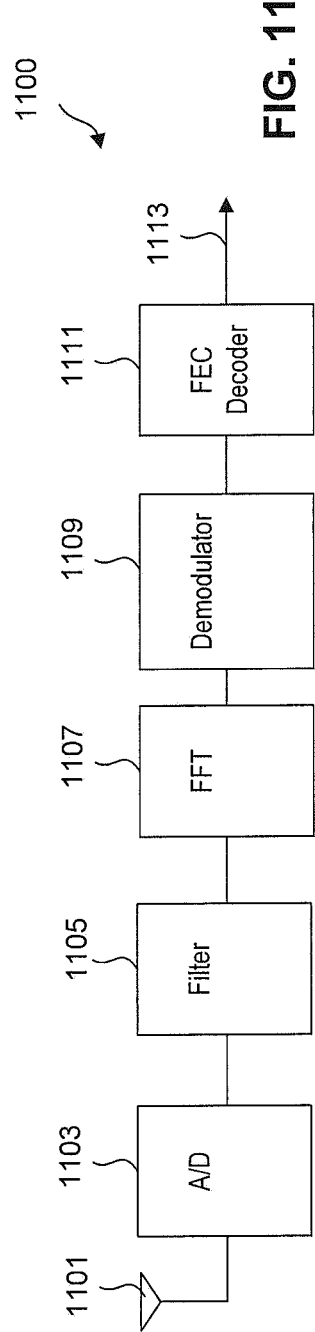
FIG. 11 illustrates an exemplary receiver device, according to some embodiments.

FIG. 11 illustrates an exemplary receiver device, according to some embodiments. Receiver device 1100 of FIG. 11 can be used as consumer receiver 110, 212 or part of consumer receiver 110, 212. Circuits and modules illustrated in FIG. 11 are exemplary circuits and modules and receiver device 1100 can include other circuits.

Receiver device 1100 can include, but is not limited to the following: a mobile phone, smartphone, personal digital assistant (PDA), navigation device, portable computer, Internet of Things (IoT), wearable devices, sensors networks, etc. According to one embodiment, receiver device 1100 can include an antenna 1101 configured to receive a signal. In one embodiment, the signal received by antenna 1101 of receiver device 1100 can include TDM frames 700 of FIG. 7. For example, the signal received by antenna 1101 of receiver device 1100 can include one or more in-band STL frames and one or more robust frames. Each one of the in-band STL frames and robust frames are preceded by a bootstrap signal, as shown in FIG. 7.

Receiver device 1100 includes an analog to digital convertor 1103 to convert the received signal from analog to digital, according to some embodiments. Although not shown, receiver device 1100 can include other circuits and/or modules between antenna 1101 and analog to digital convertor 1103, such as, but not limited to a radio frequency (RF) front end.

Receiver device 1100 includes a filter 1105, according to some examples. Filter 1105 receives the digital signal and passes through a predetermined frequency range of the digital signal. For example, filter 1105 can include a band pass filter. According to some embodiments, receiver device 1100 include an FFT module 1107 configured to receive the filtered signal. Using FFT module 1107, receiver device 1100 can translate the filtered signal from time domain to frequency domain. Receiver device 1100 can further include a demodulator circuit/module 1109. Demodulator 1109 can receive the frequency domain sequence from FFT module 1107 and recover the data from the modulated signal. The demodulated signal can pass through an FEC decoder 1111 to generate output signal 1113.

As discussed above with respect to FIG. 7, the in-band STL frames (e.g., frames 707b, 708b) of the TDM frames carry data to be relayed to other SFN transmitters and therefore, receiver device 1100 should not decode in-band STL frames. In some embodiments, TDM frames 700 can utilize mechanisms in the ATSC 3.0 standard to allow receiver device 1100 to skip decoding of frames such as in-band STL frames. For example, bootstraps (e.g., bootstraps 707a, 708a of FIG. 7) preceding in-band STL payloads (e.g., payloads 707b, 708b) can be assigned a major version number that will be ignored by receiver device 1100. In this example, after receiving the TDM frames, receive device 1100 inspects the bootstraps within the received TDM frames and determines the major version number(s) assigned to the received bootstraps. Receiver device 1100 further compares the determined major version number(s) to the major version number(s) that the receiver has been provisioned to decode. If the determined major version number(s) match the major version number(s) that the receiver has been provisioned to decode, receiver device 1100 receives the payload of the corresponding bootstrap and generates the output signal 1113.

However, if the determined major version number(s) does not match the major version number(s) that the receiver has been provisioned to decode, receiver device 1100 will ignore the payload of the corresponding bootstrap. It is noted that other higher layer signaling mechanisms available in ATSC 3.0 may also be used to ensure that receiver device 1110 does not attempt to access these in-band STL frames.

Also, as discussed above with respect to FIG. 7, in some embodiments, the bootstraps (e.g., bootstraps 704a, 705a of FIG. 7) can use the A/321 signaling known as min_time-_to_next from Table 6.2 of the ATSC 3.0 A/321 standard. This signaling indicates the starting time, in milliseconds, of the next frame having the same major version number as the bootstrap being decoded. In this example, when receiver device 1110 detects and decodes a bootstrap with a major version number matching the major version number that the receiver has been provisioned to decode, receiver device 1110 also detects the signaling information (such as min_time_to_next). Receiver device 1110 uses the detected signaling information to skip over the received TDM frames for the time determined in the signaling information (e.g., 706 in FIG. 7.) After ignoring the received TDM frames the time determined in the signaling information, receiver device 1100 resumes decoding at the start of the next applicable bootstrap corresponding to the next robust frame.

It is to be appreciated that embodiments of the disclosure can be implemented by a broadcast system having any combination of hardware, software, or firmware. A broadcast system can include, but is not limited to, a device having a processor and memory, including a non-transitory memory, for executing and storing instructions. A processor can include circuits configured to carry out logic and/or instructions to perform arithmetical, logical, and/or input/ output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory can tangibly embody the data and program instructions. Software can include one or more applications and an operating system. Hardware can include, but is not limited to, a radio frequency (RF) transmitter including an RF front-end, an antenna, a processor, and a memory. The broadcast system can also have multiple processors and multiple shared or separate memory components.

Figure 12:
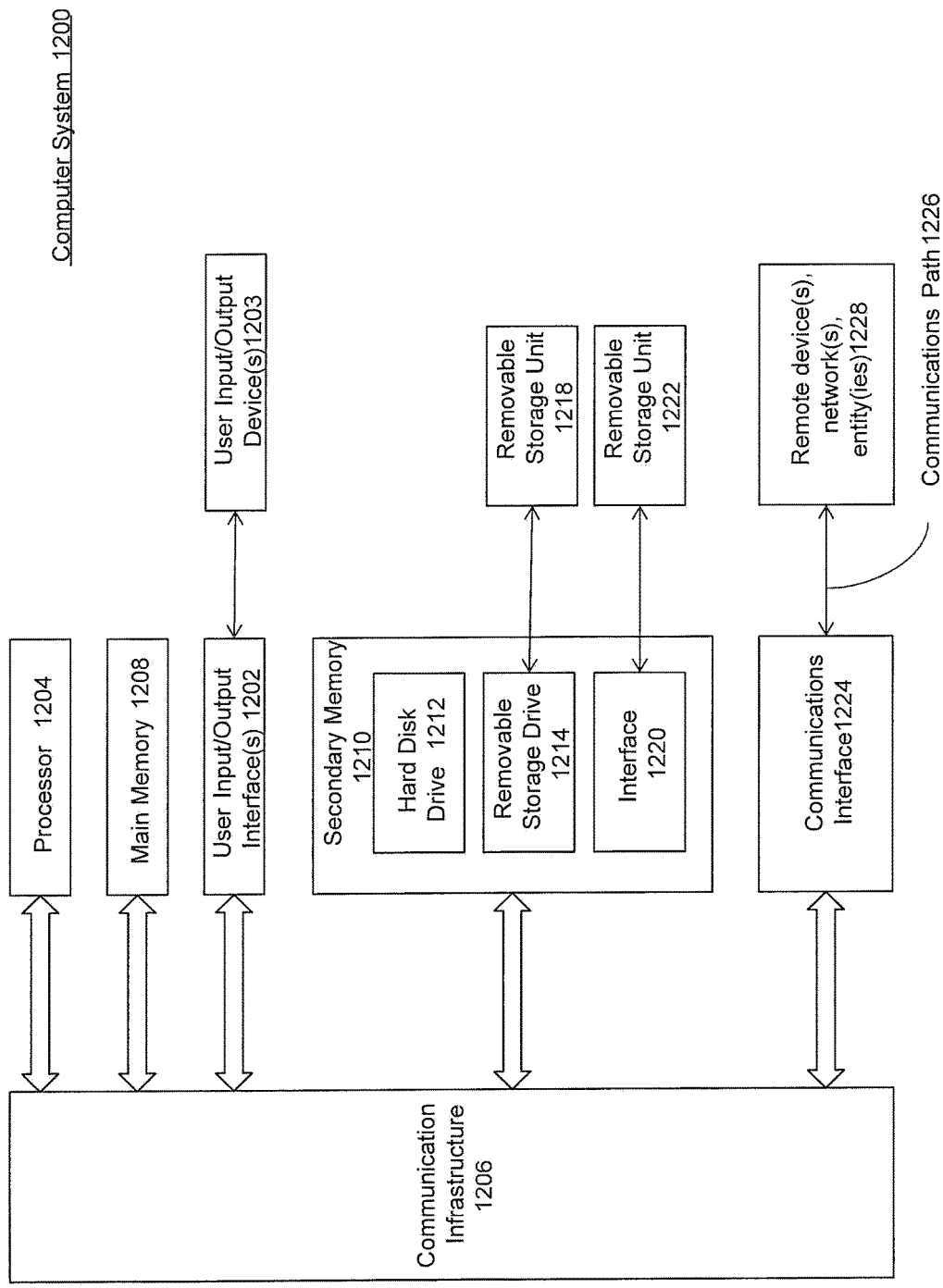
FIG. 12 illustrates a computer system that can be utilized to implement one or more embodiments.

For example, various embodiments can be implemented using one or more computer systems, such as computer system 1200 shown in FIG. 12. Computer system 1200 can be used, for example, to implement method discussed in this disclosure such as, but not limited to, method 1000 of FIG. 10A and/or method 1030 of FIG. 10B. Also, one or more of systems 100, 200, 500, and/or 600 or part of the systems can be implemented using computer system 1200. In one example, gateway 102, 202, 502, exciter 105*a-c*, 205*a*-205*c*, 504, 620, in-band STL receiver 208*a-b*, 620, SFN transmitter 106*a-c*, 206*a-c*, 505, 630, consumer receiver 110, 212, and/or receiver device 1100 can be implemented using the computer system 1200. Computer system 1200 can be any computer capable of performing the functions described herein.

Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 can include one or more levels of cache. Main memory 1208 has stored therein control logic (i.e., computer software) and/or data.

Computer system 1200 can also include one or more secondary storage devices or memory 1210. Secondary memory 1210 can include, for example, a hard disk drive 1212 and/or a removable storage device or drive 1214. Removable storage drive 1214 can be a solid state memory, a floppy disk drive, a magnetic tape drive, a compact disk drive, an optical storage device, tape backup device, and/or any other storage device/drive.

Removable storage drive 1214 can interact with a removable storage unit 1218. Removable storage unit 1218 includes a computer usable or readable storage device having stored thereon computer software (control logic) and/or data. Removable storage unit 1218 can be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 can include other means, instrumentalities or other approaches for allowing computer programs and/or other instructions and/or data to be accessed by computer system 1200. Such means, instrumentalities or other approaches can include, for example, a removable storage unit 1222 and an interface 1220. Examples of the removable storage unit 1222 and the interface 1220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 can further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 can allow computer system 1200 to communicate with remote devices 1228 over communications path 1226, which can be wired and/or wireless, and which can include any combination of LANs, WANs, the Internet, etc. Control logic and/or data can be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

It will be apparent to those skilled in the relevant art(s) that various changes in form and detail can be made therein without departing from the spirit and scope of the disclosure. Thus, the disclosure should not be limited by any of the above-described exemplary embodiments. Further, the claims should be defined only in accordance with the following claims and their equivalents.

What is claimed is:

1. A method, comprising:
   receiving, on a broadcast channel, a signal comprising a first frame encoded at a first data rate;
   forming an estimated frame by processing the received signal;
   forming a second frame by encoding the estimated frame at a second data rate; and
   broadcasting the second frame on the broadcast channel from a wireless transmitter.

2. The method of claim 1, wherein the second data rate is lower than the first data rate.

3. The method of claim 1, wherein the broadcast of the second frame is substantially synchronized with a substantially identical transmission from a different wireless transmitter.

4. The method of claim 1, wherein forming the estimated frame by processing the received signal comprises regenerating an estimated bit-interleaved coded modulation signal.

5. The method of claim 1, wherein the received signal includes control information, and wherein forming the second frame comprises encoding the estimated frame based at least in part on the control information.

6. The method of claim 5, wherein the control information comprises timing information.

7. The method of claim 1, wherein the received signal is compliant with an Advanced Television Systems Committee (ATSC) 3.0 specification.

8. An apparatus, comprising:
   an antenna tuned to a broadcast channel;
   a transmitter tuned to the broadcast channel; and
   a processor configured to:
      receive, from the antenna, a signal comprising a first frame encoded at a first data rate;
      form an estimated frame by processing the received signal;
      form a second frame by encoding the estimated frame; and
      transmit the second frame to the transmitter for wireless transmission.

9. The apparatus of claim 8, further comprising a timing circuit configured to control timing of broadcasts from the transmitter.

10. The apparatus of claim 8, wherein the processor is further configured to form the estimated frame by regenerating an estimated bit-interleaved coded modulation signal.

11. The apparatus of claim 8, wherein the received signal includes control information, and wherein processor is further configured to form the second frame by encoding the estimated frame based at least in part on the control information.

12. The apparatus of claim 11, wherein the control information comprises timing information.

13. The apparatus of claim 8, wherein the antenna is configured to receive the signal from a cooperative relay channel.

14. A method, comprising:
   receiving, on a studio-to-transmitter link, a signal comprising data;
   forming a first frame by encoding the data at a first data rate;
   forming a second frame by encoding the data at a second data rate;
   wirelessly broadcasting the first frame on a broadcast channel; and
   wirelessly broadcasting the second frame on the broadcast channel after wirelessly broadcasting the first frame on the broadcast channel,
   wherein the data comprises a television signal for transmission on the broadcast channel.

15. The method of claim 14, wherein the first data rate is higher than the second data rate.

16. The method of claim 14, wherein the first frame comprises a bootstrap signal.

17. The method of claim 14, wherein forming the first frame further comprises encoding control information corresponding to the broadcasting of the second frame on the broadcast channel.

18. The method of claim 14, wherein forming the second frame comprises forming a frame compliant with an Advanced Television Systems Committee (ATSC) 3.0 specification.

19. The method of claim 14, further comprising broadcasting the second frame substantially simultaneously from two transmitters on the same channel.

20. The method of claim 14, wherein:
   forming the first frame comprises encoding the data using a low-density parity check (LDPC) code having a first code rate; and forming the second frame comprises encoding the data using an LDPC code having a second code rate.

* * * * *

UNITED STATES PATENT AND TRADEMARK OFFICE
CERTIFICATE OF CORRECTION

PATENT NO. : 10,439,683 B1
APPLICATION NO. : 16/007265
DATED : October 8, 2019
INVENTOR(S) : Baumgartner et al.

It is certified that error appears in the above-identified patent and that said Letters Patent is hereby corrected as shown below:

In the Claims

In Column 16, Line 24, please replace "wherein processor" with --wherein the processor--.

Signed and Sealed this
Fourteenth Day of April, 2020

Andrei Iancu
*Director of the United States Patent and Trademark Office*